United States Patent
van Dijk et al.

(10) Patent No.: US 10,430,837 B2
(45) Date of Patent: Oct. 1, 2019

(54) DISPLAY REGION ALLOCATION USING CATEGORY-BASED CONTEXTUAL TECHNIQUES

(71) Applicant: PayPal, Inc., San Jose, CA (US)

(72) Inventors: Bob van Dijk, Amsterdam (NL); Wouter Haak, Amsterdam (NL); Roelof Lettinga, Amsterdam (NL)

(73) Assignee: PAYPAL, INC., San Jose, CA (US)

( * ) Notice: Subject to any disclaimer, the term of this patent is extended or adjusted under 35 U.S.C. 154(b) by 327 days.

(21) Appl. No.: 15/257,826

(22) Filed: Sep. 6, 2016

(65) Prior Publication Data

US 2016/0371743 A1 Dec. 22, 2016

Related U.S. Application Data

(63) Continuation of application No. 12/347,893, filed on Dec. 31, 2008, which is a continuation of application No. 11/773,673, filed on Jul. 5, 2007.

(60) Provisional application No. 60/806,558, filed on Jul. 5, 2006.

(51) Int. Cl.
G06Q 30/02 (2012.01)
G06Q 40/00 (2012.01)

(52) U.S. Cl.
CPC ......... *G06Q 30/0273* (2013.01); *G06Q 30/02* (2013.01); *G06Q 30/0247* (2013.01); *G06Q 30/0249* (2013.01); *G06Q 30/0254* (2013.01); *G06Q 30/0277* (2013.01); *G06Q 30/0283* (2013.01); *G06Q 40/12* (2013.12)

(58) Field of Classification Search
USPC ................................. 715/246; 705/37, 14.46
See application file for complete search history.

(56) References Cited

U.S. PATENT DOCUMENTS

2002/0188551 A1* 12/2002 Grove .................... G06Q 30/08
705/37
2006/0085741 A1* 4/2006 Weiner .............. G06F 17/30893
715/246
2006/0271438 A1* 11/2006 Shotland ................ G06Q 30/02
705/14.46

\* cited by examiner

*Primary Examiner* — Saba Dagnew
(74) *Attorney, Agent, or Firm* — Maschoff Brennan

(57) ABSTRACT

A computer-implemented system and method for category-based contextual advertisement generation and management are disclosed. The system in an example embodiment includes an advertisement processor to allocate a first display region for displaying a combination of variable revenue ads and fixed price ads, the variable revenue ads and the fixed price ads being category-based, sort the variable revenue ads based in part on a user entered variable revenue value, and sort the fixed price ads based on a rotation.

20 Claims, 16 Drawing Sheets

ASSUMPTIONS:
USER HAS:
- THREE ADS IN THE SAME CATEGORY
- CURRENTLY, ONE LIVE FIXED PRICE AD (NOTE CHECK MARK IN 25,00 BLOCK)

| | | | | 3303 | |
|---|---|---|---|---|---|
| 3301 — FDSF | 1 | ☐ €1,30 | ☑ €25,00 | ☐ €45,00 | ☐ €12,00 |
| WERF | 1 | ☐ €1,30 | ☐ €15,00 | ☐ €30,00 | ☐ €9,00 |
| DSDS | 4 | ☐ €1,30 | ☐ €40,00 | ☐ €45,00 | ☐ €12,00 |

EXAMPLE1:
USER CHECKS SECOND AD TO BE FEATURED AS A FIXED PRICE AD (NOTE CHECK MARK IN 15,00 BLOCK FOR AD IDENTIFIED AS "WERF").
- UPON CHECK OF THE SECOND AD TO FEATURE AS A FIXED PRICE AD, THE THIRD AD (I.E. AD IDENTIFIED AS "DSDS") NOW AUTOMATICALLY GOES TO SOLD OUT STATUS (NOTE CHECK MARK AUTOMATICALLY ADDED IN 40,00 BLOCK FOR AD IDENTIFIED AS "DSDS")
- IF USER UNSELECTS SECOND AD, THE SOLD OUT STATUS OF THE THIRD AD IS AUTOMATICALLY REMOVED. IN THIS MANNER, A LIMIT CAN BE DEFINED AS A MAXIMUM OF TWO FIXED PRICE ADS PER CATEGORY

| FDSF | 1 | ☐ €1,30 | ☑ €25,00 | ☐ €45,00 | ☐ €12,00 |
|---|---|---|---|---|---|
| WERF | 1 | ☐ €1,30 | ☑ €15,00 | ☐ €30,00 | ☐ €9,00 |
| DSDS | 4 | ☐ €1,30 | ☑ €40,00 | ☐ €45,00 | ☐ €12,00 |

EXAMPLE2:
- FIRST AD (IDENTIFIED AS "FDSF") IS IN A DIFFERENT CATEGORY FROM THE SECOND AND THIRD AD.
- USER IS NOW ABLE TO SELECT EITHER THE SECOND OR THE THIRD AD OR BOTH THE SECOND AND THIRD ADS TO BE FEATURED AS FIXED PRICE ADS IN THIS CATEGORY. IN THIS MANNER, A LIMIT CAN BE DEFINED AS A MAXIMUM OF TWO FIXED PRICE ADS PER CATEGORY).

| FDSF | 1 | ☐ €1,30 | ☑ €25,00 | ☐ €45,00 | ☐ €12,00 |
|---|---|---|---|---|---|
| WERF | 1 | ☐ €1,30 | ☑ €15,00 | ☐ €30,00 | ☐ €9,00 |
| DSDS | 4 | ☐ €1,30 | ☑ €40,00 | ☐ €45,00 | ☐ €12,00 |

DISPLAY REGION ALLOCATION USING CATEGORY-BASED CONTEXTUAL TECHNIQUES

CROSS-REFERENCE TO RELATED PATENT APPLICATIONS

This patent application is a continuation application that claims the benefit of the filing date of U.S. patent application Ser. No. 12/347,893, filed Dec. 31, 2008, and entitled SYSTEM AND METHOD FOR CATEGORY-BASED CONTEXTUAL ADVERTISEMENT GENERATION AND BIDDING"; which is a continuation application that claims the benefit of the filing date of U.S. patent application Ser. No. 11/773,673, filed Jul. 5, 2007, and entitled, "SYSTEM AND METHOD FOR CATEGORY-BASED CONTEXTUAL ADVERTISEMENT GENERATION AND MANAGEMENT"; which claims the benefit of the filing date of U.S. Provisional Patent Application Ser. No. 60/806,558, filed Jul. 5, 2006, and entitled, "SYSTEM AND METHOD FOR CATEGORY-BASED CONTEXTUAL ADVERTISEMENT GENERATION AND BIDDING"; each of which are incorporated by reference in its entirety.

BACKGROUND

Technical Field

This disclosure relates to methods and systems supporting online advertising and online transactions by a user. More particularly, the present disclosure relates to category-based contextual advertisement generation and management.

Related Art

An increasingly popular way of delivering Internet advertisements is to tie the presentation of advertisements to particular user behaviors and/or user profiles, and/or user demographics. Such user behaviors include user access to a particular web page, user selection (also called mouse-clicking or clicking) of a particular location on a web page, user entry of a particular search string or keyword, and the like. In order to target advertising accurately, advertisers or vendors pay to have their advertisements presented in response to certain kinds of events—that is, their advertisements are presented when particular user behaviors warrant such presentation. If a particular advertisement (ad) leads to some user action, an advertiser may receive remuneration for the ad.

Using other systems and processes on the Web, users can search for goods and services via the Internet and shop or make purchases of goods or services over the Internet. Unfortunately, conventional systems have not been able to create an effective way of using on-line product/service category definitions to create and enable bidding on contextual advertisements that may lead to a user purchase transaction.

U.S. Pat. No. 5,948,061 discloses methods and apparatuses for targeting the delivery of advertisements over a network such as the Internet. Statistics are compiled on individual users and networks and the use of the advertisements is tracked to permit targeting of the advertisements of individual users. In response to requests from affiliated sites, an advertising server transmits to people accessing the page of a site an appropriate one of the advertisements based upon profiling of users and networks. However, the '061 patent does not describe or suggest using on-line product/service category definitions to create and enable bidding on contextual advertisements.

Thus, a system and method for category-based contextual advertisement generation and management is needed.

BRIEF DESCRIPTION OF THE DRAWINGS

Embodiments illustrated by way of example and not limitation in the figures of the accompanying drawings, in which:

FIG. 1 illustrates an example embodiment in which an example of a host site web page is shown.

FIG. 3 illustrates an example of part of the view item page, with which the visitor/user can be offered one of several options to purchase/lease/bid on or otherwise initiate a transaction associated with a selected item.

FIG. 5 illustrates an example of a gallery view (i.e. a picture view) of a categorized list of product ads in an example embodiment.

FIG. 8 illustrates an example user interface screen displayed in the creation of a fixed price ad in an example embodiment.

FIGS. 10 and 11 illustrate detailed results reports in a particular embodiment that enable a merchant/advertiser to view a set of metrics related to each advertisement (variable revenue or fixed price) the advertiser has created in the system of a particular embodiment.

FIG. 16 illustrates an example embodiment in which an example of a host site web page is shown and some advantages are identified.

DETAILED DESCRIPTION

Figure 2:
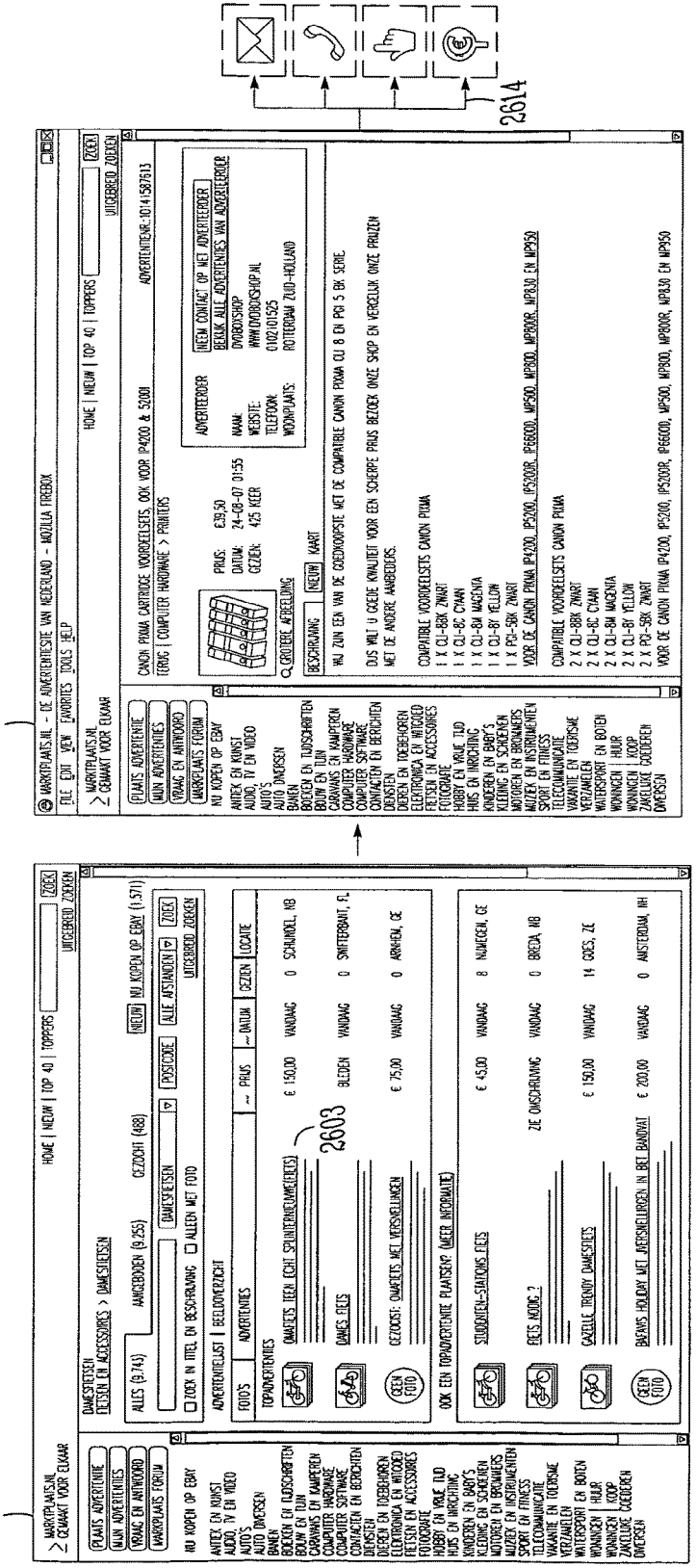
FIG. 2 illustrates an example embodiment in which a visitor/user is viewing the example host site web page, which includes a first display region and a second display region.

A computer-implemented system and method for category-based contextual advertisement generation and management are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a computer-implemented system and method for category-based contextual advertisement generation and management. The system includes an advertisement processor to allocate a first display region for displaying a combination of variable revenue ads and fixed price ads, the variable revenue ads and the fixed price ads being category-based, sort the variable revenue ads based in part on a user entered variable revenue value, and sort the fixed price ads based on a rotation. Various embodiments are described below in connection with the figures provided herein.

Definitions

Functionality for various embodiments is described below. Some definitions follow.
An advertisement (ad) can be a product or service listing item, a purchase/lease/bid solicitation, or a display object related to a product or service.
A view is a serving of the View item page (VIP), the page that shows the advertisement (ad), and is the same as a click (from the result set to the VIP)
An impression is when an ad is shown in the result set (e.g. in browse or in a search function)

The following acronyms are defined as follows.
SYI—Sell your item, the flow where users build their ad.
RYI—Revise your item, the flow where users edit their existing ad.
VIP—View item page, the page that shows the ad.
CSV—comma separated value, filetype (industry standard), used to export the performance data of the ad.
LTS—Live to site means content that is live (i.e. available) on the site for the users.
CPC—Cost per click, the amount the advertisers pay for a click. A click is counted when the VIP is served to a visitor of a host site.
CTR—Click through rate, the ratio of the user being exposed to the ad and actually clicking to see the ad.
RPM—RPM stands for 'Revenue per Thousand' ('M' being the Roman numeral for 1,000). RPM is how much revenue is generated per thousand impressions. RPM can be calculated as a function of CPC and CTR.
RMC—RMC represents a $3^{rd}$ party billing service to which billing processes of various embodiments can be outsourced. The $3^{rd}$ party billing service can be sent a file with all the (cumulative) amounts and $3^{rd}$ party billing service forwards an invoice.

OVERVIEW OF VARIOUS EMBODIMENTS

Category-based advertisement functionality of various embodiments enables users to buy a premium position on web pages with ad listings. As described in more detail below, various embodiments provide category-based CPC & relevance-based product rankings and associated listings of product advertisements. In various embodiments, the ad listings are arranged on each web page according to a combination of different types of ad listings. In a particular embodiment, these types of ad listings include fixed price ads and variable revenue ads (also denoted herein as RPM ads). Other ads, such as standard classified ads, can also be shown on the web page. Fixed price ads can be advertisements or product listings that are displayed on a host site for a fixed price paid by the merchant/advertiser or product/service provider to the host site. Variable revenue ads (e.g. RPM ads) are advertisements or product/service listings for which a merchant/advertiser pays to the host site a value corresponding in part to a CPC associated with the advertisement or product/service listing. Based on the RPM derived from the CPC (RPM=function(CPC, CTR), the ads are arranged on each web page by the host site according to a sorting of the RPM corresponding to the ad (e.g. the ad with the highest RPM displayed in the most valuable position to the ad with lowest RPM displayed in the least valuable position). In this manner, an advertiser can essentially bid on a position for a variable revenue ad by paying a value for the ad that will correspond to a CPC, which will correspond to the desired level of RPM and thus the desired display position on the host site. Alternatively, the advertiser can opt to use a simpler process and pay a fixed price for the ad and obtain a fixed price ad that is displayed in combination with variable revenue ads and other fixed price ads in a display region separate from other ads on a host site web page.

As will be described in more detail below for an example embodiment, two types of ads are displayed concurrently in a first region of the host site web page and arranged/sorted using two different processes. Other ads are displayed in a second region of the host site web page and arranged/sorted using a conventional process. In the particular embodiment described, each listing page (i.e. search/browse results within a specific product category) shows at least two display regions; a first display region on top (e.g. in the most valuable position) shows a mix of variable revenue ads and fixed price ads. The second display region at the bottom (e.g. in a less valuable position) is used to display other standard classified ads. Within the first display region, the top two positions (e.g. the top two most valuable positions) are used for displaying variable revenue ads, assuming there is a sufficient inventory of variable revenue ads. Also within the first display region, the third position is used to display fixed price ads, assuming there is a sufficient inventory of fixed price ads. In general, if there is an insufficient inventory of one type of ad, different types of ads can be moved into the display positions that would otherwise have been allocated to ads of the type for which the inventory was insufficient.

In a particular embodiment, merchants/advertisers/others can purchase two different types of ad listings:
1. Fixed Price Ad product
   Ads are sold at a fixed price,
   Ads can be purchased for a particular product/service category,
   Displayed for a fixed time period (e.g. a number of days),
   Sorted and displayed in the third position of the first display region of each listing page based on a fixed rotation schedule and a fixed limited amount of display time at each position.
2. Variable Revenue (e.g. RPM) Ad product
   Fair pricing through bidding (e.g. on price per click),
   Ads can be purchased for a particular product/service category,
   Sorted and displayed in the top two positions of the first display region of each listing page based on cost per click and user activity (e.g. RPM). The variable revenue ads are sorted according to:
     Prior to any click-throughs of the ad, a testing phase defines the RPM for the ad as a function of CPC and CTR (of the category associated with the ad).
     Upon receiving click-throughs for the ad, the RPM for the ad is a function of CPC and CTR (for the last 24 hours the ad was displayed).

Figure 1:
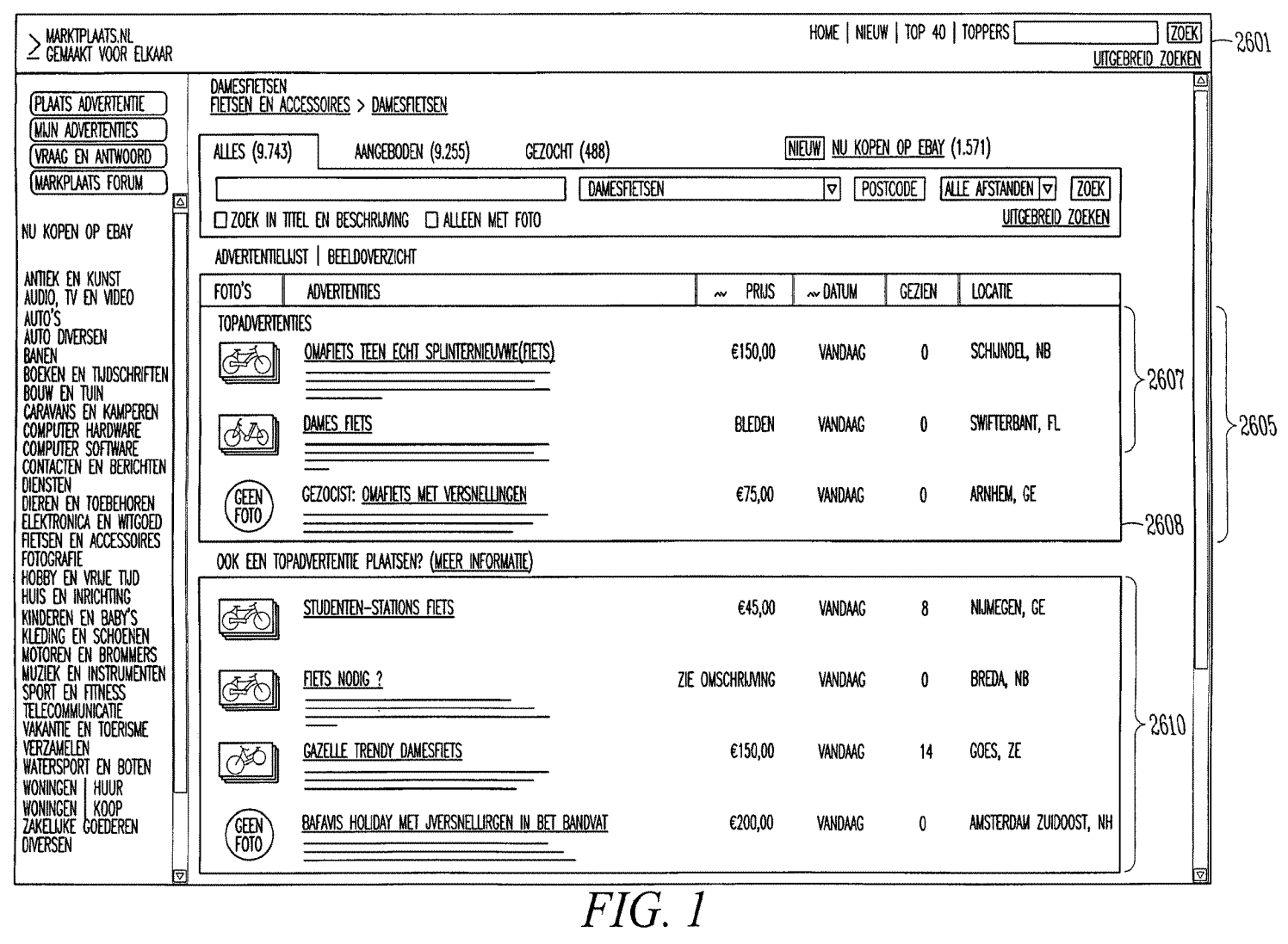

In a particular embodiment, the host site that displays purchased ads displays the ads depending on the different types of ad listings. In a first display region, the variable revenue ads are displayed in the top two positions (in one embodiment) of every page showing variable revenue ads in a browse or search mode. Also in the first display region, the fixed price ads are displayed in the third position (in one embodiment) of every page showing fixed price ads in a browse or search mode. In a second display region, other conventional classified ads are shown on each page showing other ads in a browse or search mode. An example of a host site web page displaying the first and second display regions is illustrated in FIG. 1.

Figure 16:
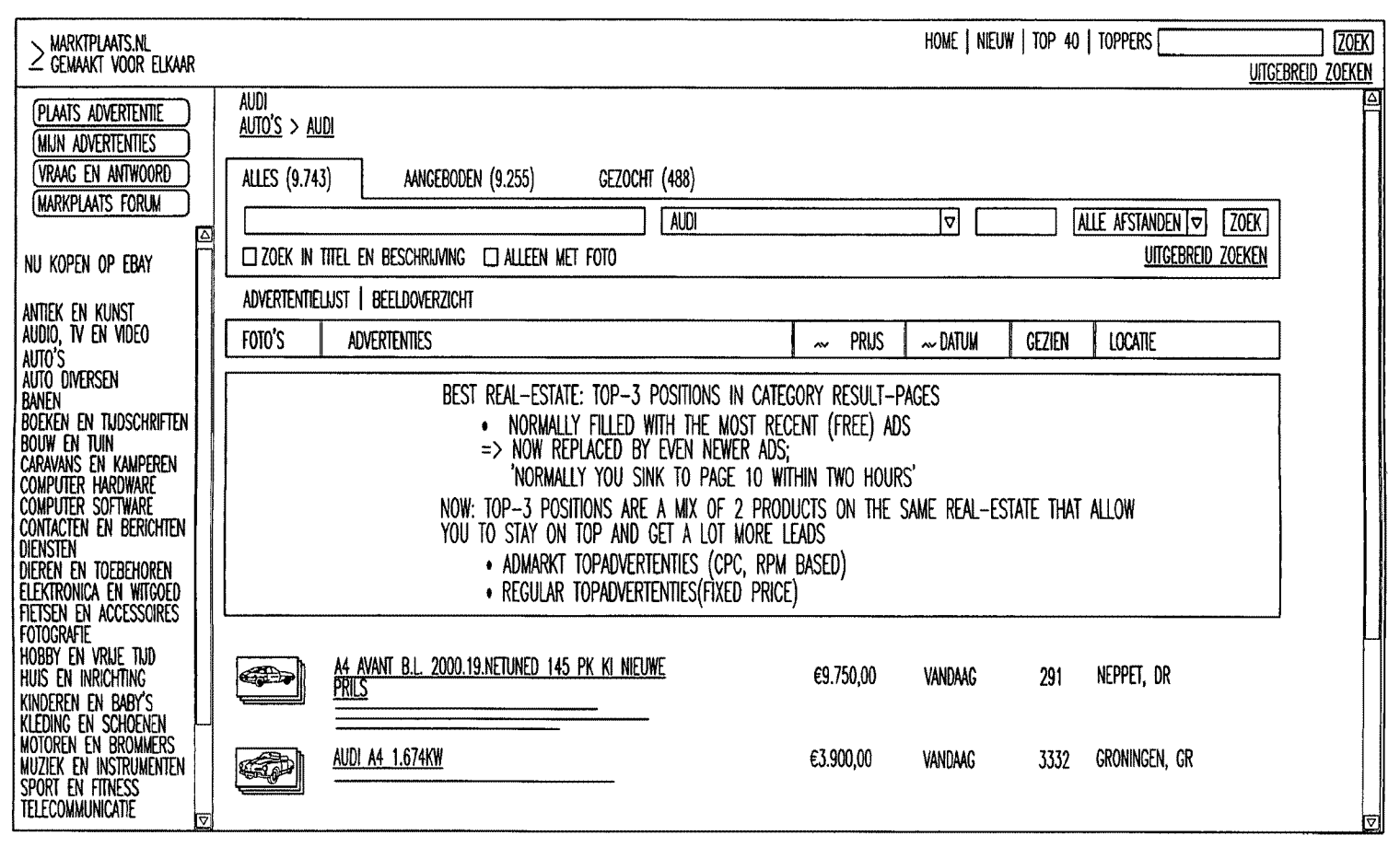

FIG. 16 illustrates an example embodiment in which an example of a host site web page is shown and some advantages of various embodiments are identified.

Figure 17:
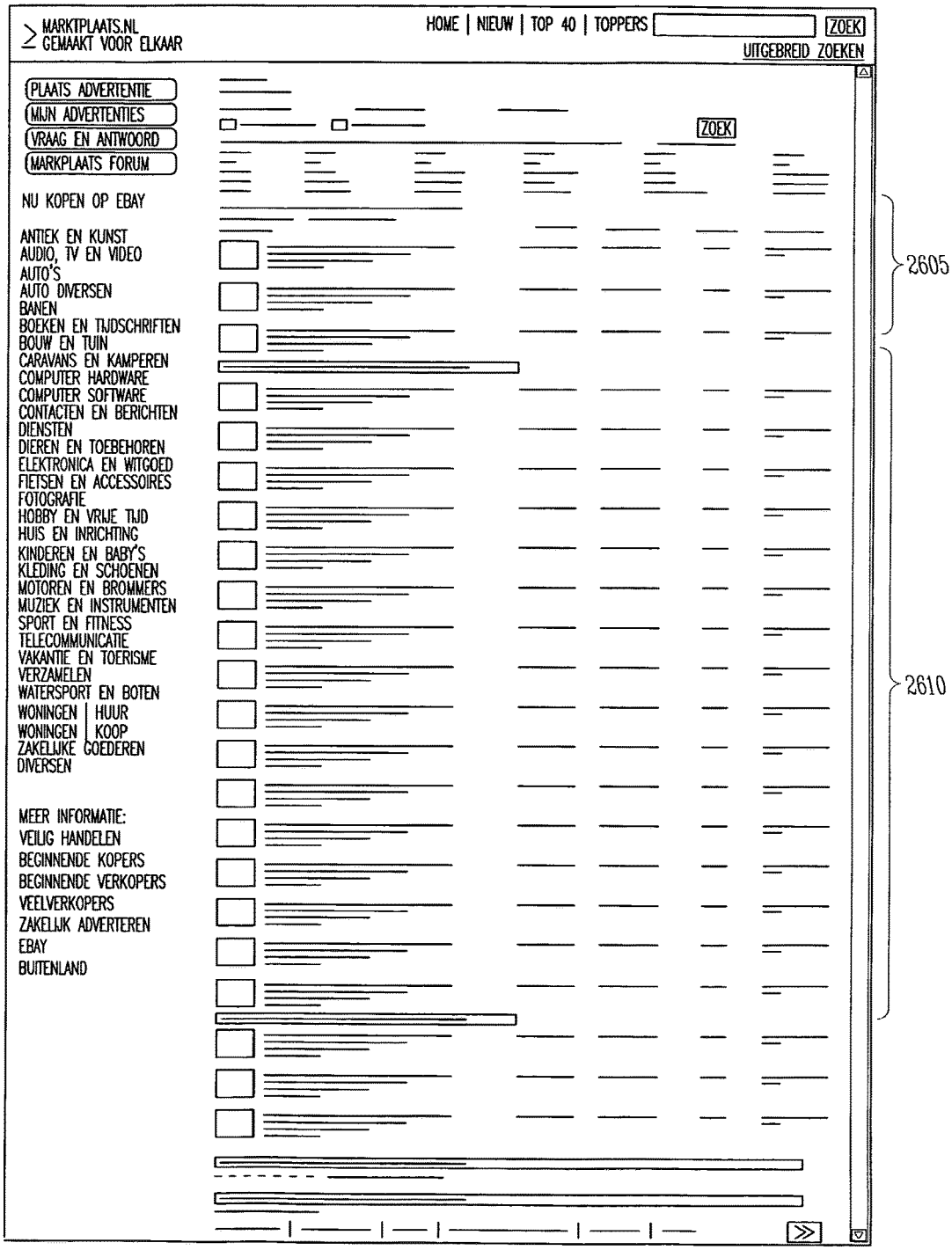
FIG. 17 illustrates another example embodiment in which an example of a host site web page is shown.

FIG. 17 illustrates another example embodiment in which an example of a host site web page is shown.

Referring to FIG. 1, an example of a host site web page 2601 is shown. In a particular embodiment, the host site web page includes a first display region 2605 and a second display region 2610. In this example, the first display region 2605 is used for displaying a mix of the variable revenue ads in the top two positions 2607 (in one embodiment) and fixed price ads in a third position 2608 of the first display region 2605. The second display region 2610 is used for displaying other conventional classified ads. Note that it will be apparent to those of ordinary skill in the art that a greater or lesser number of ads of each type can be displayed in the host page 2601. Further, the arrangement of the first display region 2605 and the second display region 2610 can be horizontal, vertical, tiled or in any other suitable arrangement on web page 2601. Note also that there is no difference in the look and feel of the variable revenue ad and the fixed price ad in the first display region.

As shown in the example of FIG. 1, the three ad positions in the first display region 2605 can be used to show a combination of variable revenue ads and fixed price ads. In a particular embodiment, the topmost position (e.g. most valuable position) in the first display region 2605 is used to display the variable revenue ad with the highest RPM. The next lower position in the first display region 2605 is used to display the variable revenue ad with the next highest RPM. In a particular embodiment, the third position 2608 of the first display region is used to display a fixed price ad based on a fixed ad rotation schedule (described in more detail below) and a fixed limited amount of display time at a current position on the current page. If there are not enough variable revenue ads in the paid inventory of variable revenue ads to fill the most valuable positions 2607 in the first display area 2605, fixed price ads can be moved into the most valuable positions 2607 of the first display region 2605 to fill empty positions that would otherwise be occupied by variable revenue ads. Conversely, if there are not enough fixed price ads in the paid inventory of fixed price ads to fill positions in the first display area 2605, variable revenue ads can be moved into positions of the first display region 2605 to fill empty positions that would otherwise be occupied by fixed price ads.

As also shown in the example of FIG. 1, the ad positions in the second display region 2610 can be used to show other ads (e.g. standard classified ads). Note that in the example shown in FIG. 1, the mix of variable revenue ads and fixed price ads displayed in the first display region 2605 appear similar in the look and feel of the ads. Thus, there is no need to display the different types of ads in a different display style (although a level of differentiation could be employed).

Both types of ads (i.e. variable revenue ads and fixed price ads) may or may not include links within the ad with which a user can click the ad leave the host site and obtain more detail on the ad listing or initiate a purchase/lease/bid transaction. However, unlike conventional ad listings, the visitor/user who clicks on an ad is not redirected to an advertiser or merchant website associated with the ad. In the various embodiments described herein, the visitor/user who clicks on an ad is directed to another host site web page. In one embodiment, the visitor/user who clicks on an ad is directed to a host site view item web page that shows additional detail on the selected item. In one embodiment, the view item web page is not hosted by the merchant/advertiser. The view item web page is hosted by the host site. However, the view item web page may contain a link to the merchant/advertiser site, the merchant/advertiser site being associated with the product/service represented in the ad clicked by the visitor/user. The visitor/user can use this link in the view item web page to click through to the merchant/advertiser site from the view item web page. This is described in more detail below in connection with FIG. 2.

Figure 3:
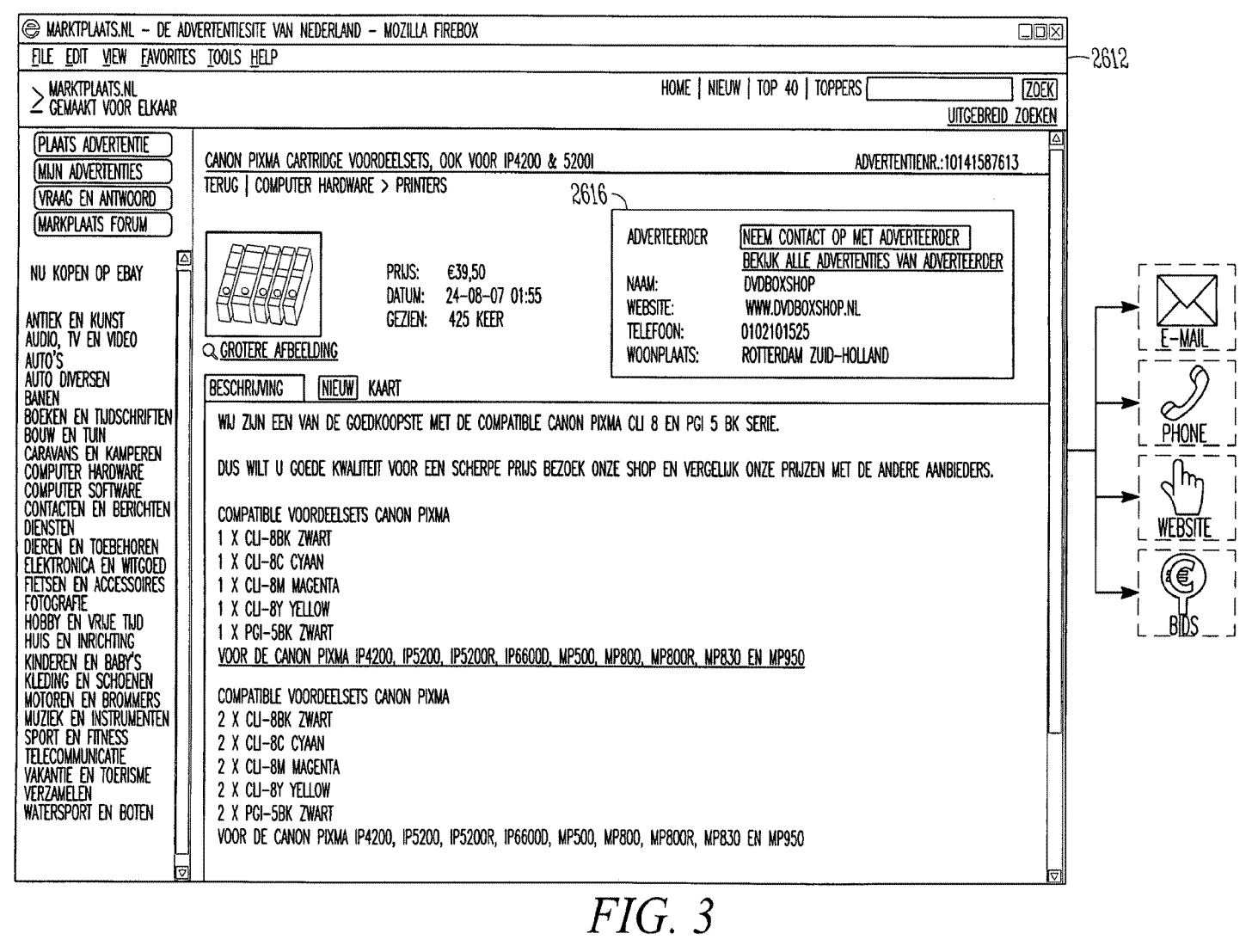

FIG. 2 illustrates an embodiment in which a visitor/user is viewing the example host site web page 2601, which includes a first display region 2605 (shown in FIG. 1) and a second display region 2610 (shown in FIG. 1). In this example, the visitor/user clicks on a particular ad 2603 within page 2601. Note that ad 2603 can be either a fixed price ad or a variable revenue ad. As a result of clicking on ad 2603, the visitor/user is directed to a view item page 2612 on the host site. The view item page 2612 includes additional detailed information on the selected item associated with the ad 2603 clicked by the visitor/user. As part of the view item page 2612 or via another portion of the user interface, the visitor/user can be offered (via option block 2616 shown in FIG. 3) one of several options 2614 to purchase/lease/bid on or otherwise initiate a transaction associated with the selected item. In a particular embodiment, these options 2614 to purchase include an emailed purchase request, a purchase by telephone with a host site representative, an on-line purchase transaction via a website, or a bid transaction. These options are shown in more detail in FIG. 3.

Figure 4:
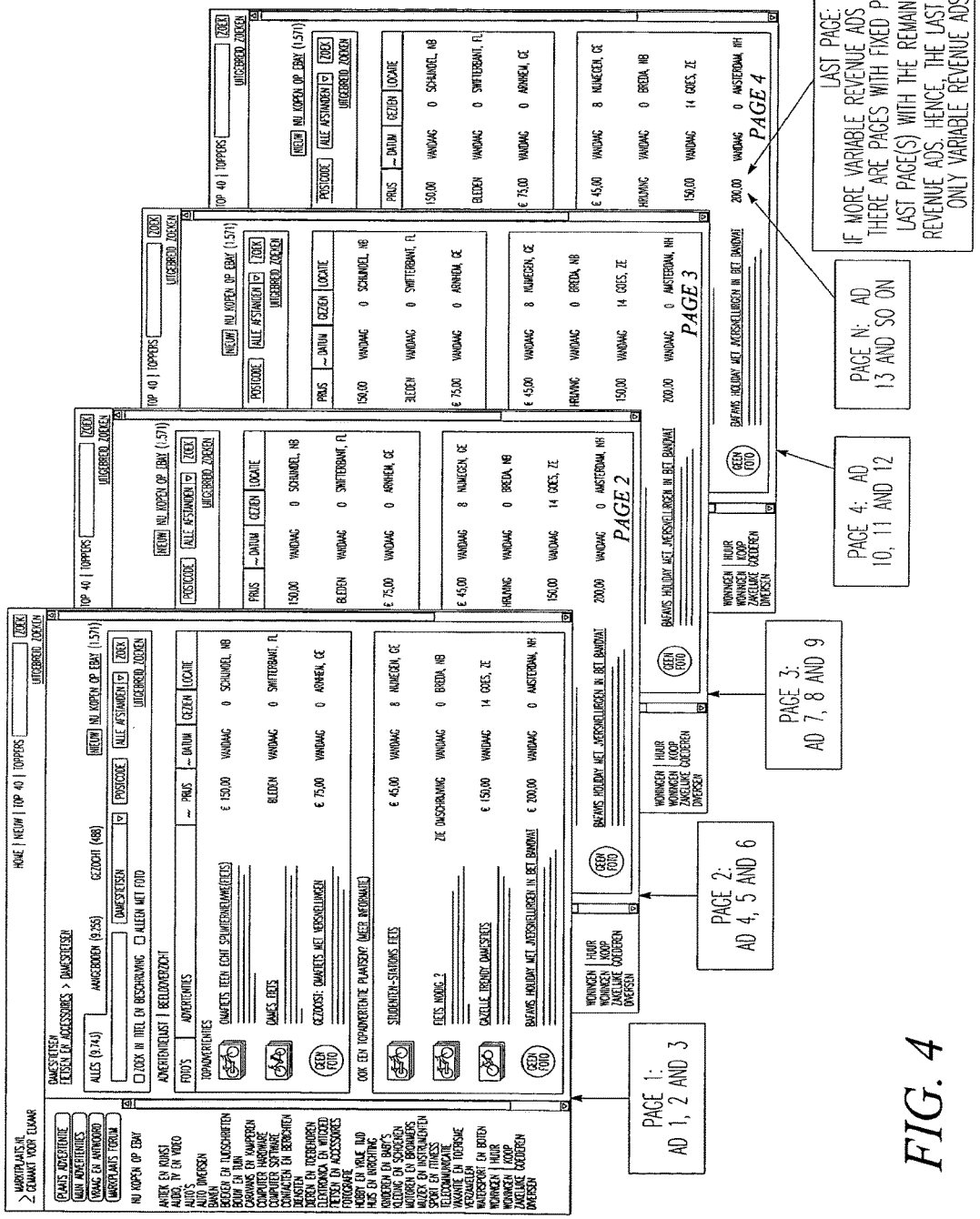
FIG. 4 illustrates an example of multiple host site web pages.

FIG. 4 illustrates an example of multiple host site web pages 2601. As shown in FIG. 4, the first page (page 1) of a categorized list of product/service ads can be used to show the first three ads (e.g. ads 1, 2, and 3) of a set of mixed variable revenue ads and fixed price ads in the first display region of each page. The second page (page 2) of the categorized list of product/service ads can be used to show the second group of three ads (e.g. ads 4, 5, and 6) of the set of mixed variable revenue ads and fixed price ads in the first display region of each page. Similarly, a mix of variable revenue ads in sorted order (based on RPM value) and fixed price ads (sorted in a rotation) are shown in subsequent web pages in the first display region of each page until all of the variable revenue ads and fixed price ads from the available inventory of paid variable revenue ads and fixed price ads have been displayed. If more variable revenue ads are available than there are pages with fixed price ads, the last page(s) can be filled with the remainders of variable revenue ads. Conversely, if more fixed price ads are available than there are pages with variable revenue ads, the last page(s) can be filled with the remainders of fixed price ads. Hence, the last page(s) can have only variable revenue ads or only fixed price ads in the first display region on the page. It will be apparent to those of ordinary skill in the art that the first display region can include more than or less than three ads of a set of mixed variable revenue ads and fixed price ads in the first display region of each page.

Similarly, as shown in FIG. 4, other ads can be displayed in the second display region of each page below the first display region. The first page (page 1) of the categorized list of product ads can be used to show the first several ads of a set of other ads in the second display region of each page. The second page (page 2) of the categorized list of product/service ads can be used to show the second group of several other ads of the set of other ads in the second display region of each page. Similarly, other ads in sorted order (e.g. based on recency) are shown in the second display region in subsequent web pages until all of the other ads from the available inventory of other ads have been displayed.

Figure 5:
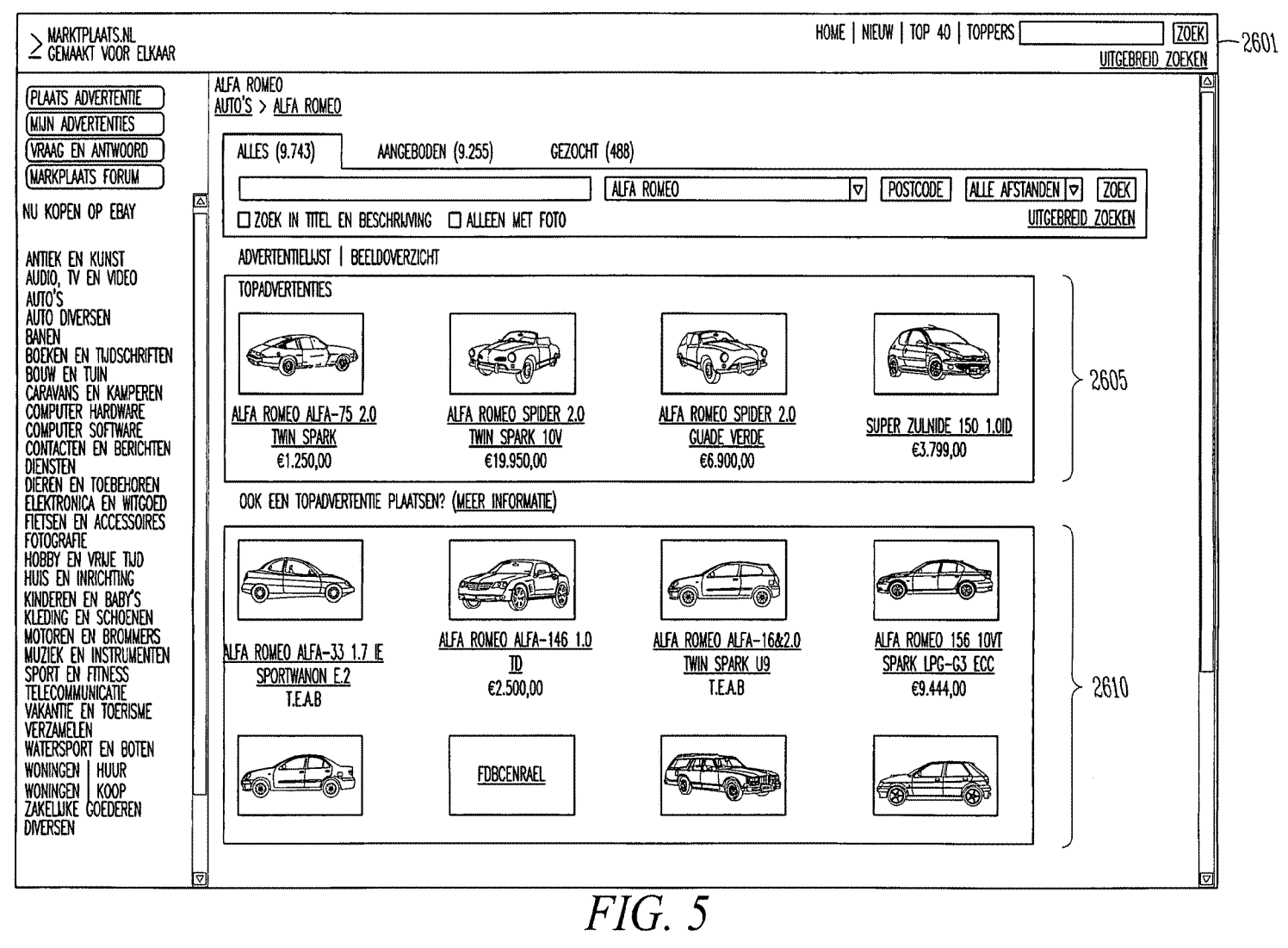

FIG. 5 illustrates an example of a gallery view (i.e. a picture view) of a categorized list of product ads. In similar fashion to the categorized list of product/service ads shown in a list view and described above, the example host site web page 2601 in gallery view, in a particular embodiment, includes a first display region 2605 and a second display region 2610. In this example, the first display region 2605 is used to show a mix of variable revenue ads and fixed price ads in the top four positions (in one embodiment). The second display region 2610 is used to show other ads in the lower positions (in one embodiment). Note that it will be apparent to those of ordinary skill in the art that a greater or lesser number of ads of each type can be displayed in the host page 2601. Further, the arrangement of the first display region 2605 and the second display region 2610 can be horizontal, vertical, tiled or in any other suitable arrangement on web page 2601.

As shown in the gallery view example of FIG. 5, the four ad positions in the first display region 2605 can be used to show a mix of variable revenue ads and fixed price ads. In a particular embodiment, the leftmost position in the first display region 2605 is used to display the variable revenue ad with the highest RPM. The next position to the right in the first display region 2605 is used to display the variable revenue ad with the next highest RPM and so on. The last position(s) (e.g. least valuable position or positions) of the first display region 2605 is used for displaying fixed price ads (sorted in a rotation). If there are not enough variable revenue ads in the paid inventory of variable revenue ads to fill the positions in the first display area 2605, fixed price ads can be moved into the more valuable positions in the first display region 2605 to fill empty positions that would otherwise be occupied by variable revenue ads.

As also shown in the example of FIG. 5, the several ad positions in the second display region 2610 can be used to show other ads. In a particular embodiment, the leftmost position in the second display region 2610 is used to display the other ad most recently placed (i.e. recency—the most recent ad). The next position to the right in the second display region 2610 is used to display the next most recent other ad and so on.

Figure 6:
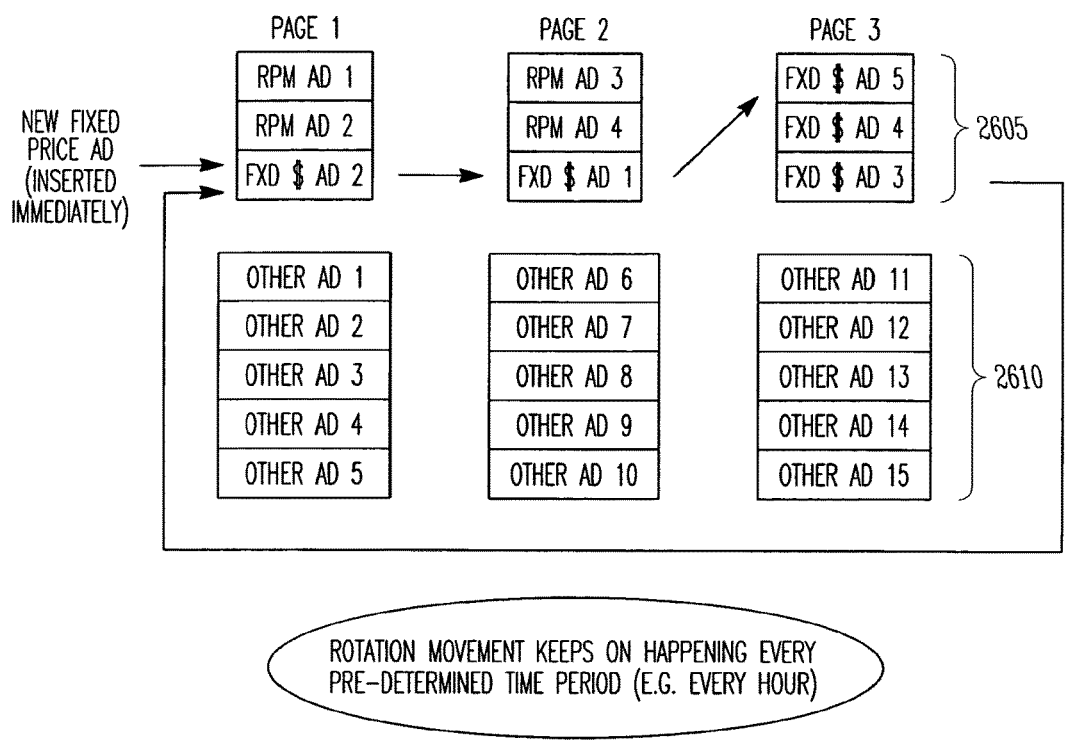
FIG. 6 illustrates an example embodiment showing a rotation of fixed price ads among the positions allocated to fixed price ads in the first display region in multiple pages.

FIG. 6 illustrates an example embodiment showing a rotation of fixed price ads among the positions allocated to fixed price ads in the first display region in multiple pages. As illustrated, each page of a host site listing can have a first display region 2605 and a second display region 2610. In a particular embodiment, the first display region 2605 can be used for the displaying a mix of variable revenue ads and fixed priced ads. Typically, the variable revenue ads would be shown more prominently (e.g. above) the fixed price ads in the first display region 2605. Typically, only other ads are shown in the second display region 2610. Given that the first display region 2605 can be used for the displaying of both variable revenue ads and fixed priced ads, a particular embodiment rotates the top few fixed price ads through a portion of the first display region 2605 of each page to give these top few fixed price ads an opportunity to be seen in the more valuable positions of the first few pages. The top portion of the first page (i.e. page 1) is considered the most valuable portion of the list as this portion is most likely viewed and clicked on by a user. By rotating the top few fixed price ads through a portion of the first display region of the first few pages, each top fixed price ad gets shown in the most valuable portion of the list.

As shown in the example of FIG. 6, the top few fixed price ads (e.g. Fixed $ Ad 1, Fixed $ Ad 2, Fixed $ Ad 3, Fixed $ Ad 4, Fixed $ Ad 5) are displayed in the first display region 2605 of three pages (pages 1, 2, and 3) of a host site list. Variable revenue ads (RPM Ads 1-4) are shown in the upper portion (e.g. more valuable portion) of the first display region on pages 1 and 2. In this example, there are only four variable revenue ads in the inventory of variable revenue ads; thus, the full inventory of variable revenue ads can be shown in the first two positions of the first display region 2605 of the first two pages. It will be apparent to those of ordinary skill in the art that additional pages and additional positions of the first display region 2605 of each page can be used to display the full inventory of variable revenue ads. In the remaining one or more positions in the first display region 2605 of each page that are not allocated to variable revenue ads, the top few fixed price ads (e.g. Fixed $ Ad 1, Fixed $ Ad 2, Fixed $ Ad 3, Fixed $ Ad 4, and Fixed $ Ad 5) can be displayed in rotating fashion. Similarly, the positions of the first display region 2605 can all be allocated to fixed price ads when the full inventory of variable revenue ads have been displayed on previous pages (e.g. see page 3 shown in FIG. 6).

As shown in FIG. 6, the third position of the first display region 2605 of page 1 is currently allocated to Fixed $ Ad 2. The third position of the first display region 2605 of page 2 is currently allocated to Fixed $ Ad 1. The Fixed $ Ad 1 had formerly been allocated to the third position of the first display region 2605 of page 1 prior to the rotation of Fixed $ Ad 1 to its current position. Fixed $ Ad 2 had formerly been allocated to the third position of the first display region 2605 of page 3 prior to the rotation of Fixed $ Ad 2 to its current position. The top few fixed price ads are displayed in their current positions of the rotation for a pre-determined time period (e.g. one hour). At the expiration of the pre-determined time period, the top few fixed price ads are rotated to the next position. For example, in a next rotation cycle shown in FIG. 6, Fixed $ Ad 1 will move to the top position of the first display region 2605 of page 3. Fixed $ Ad 2 will move to the third position of the first display region 2605 of page 2. Fixed $ Ad 3 will move to the third position of the first display region 2605 of page 1. Fixed $ Ad 4 and Fixed $ Ad 5 will move down one position in the first display region 2605 of page 3. This rotation pattern will continue while there are still variable revenue ads and fixed price ads in the inventory.

When a new fixed price ad is added to the inventory, the new fixed price ad can be immediately included in the rotation of the top few fixed price ads at the third position of the first display region 2605 of page 1. The new fixed price ad then continues in the rotation described above. When a new variable revenue ad is added to the inventory, the new variable revenue ad is allocated to a position in the first display region according to the RPM value of the ad. That is, the highest value variable revenue ad is allocated to the first (i.e. top) position of the first display region 2605 of the first page. The next highest value variable revenue ad is allocated to the second position of the first display region 2605 of the first page and so on.

The top few fixed price ads can be rotated through portions of the first display region 2605 of each page as described above. In the particular example shown in FIG. 6, the five most recently created (i.e. top few) fixed price ads are rotated through portions of the first display region 2605 of each page as described. It will be apparent to those of ordinary skill in the art that other criteria can be used to define the top few fixed price ads. Other ads can be displayed in the second display regions 2610 of each page as shown in the example of FIG. 6.

In a particular embodiment, if the CTR on an add falls below a certain pre-defined limit, the ad is removed from the ranking (and appropriate messaging occurs). If an ad does not meet the pre-defined CTR threshold, the ad can be removed from the host site list and search index.

Category-based advertisements can have a regular ad (e.g. other standard classified ad) as a related sibling ad. These sibling ads can behave similarly to conventional ads. Click-throughs of a sibling ad can be included in the count of click-throughs for a related variable revenue ad or fixed price ad.

Figure 7:
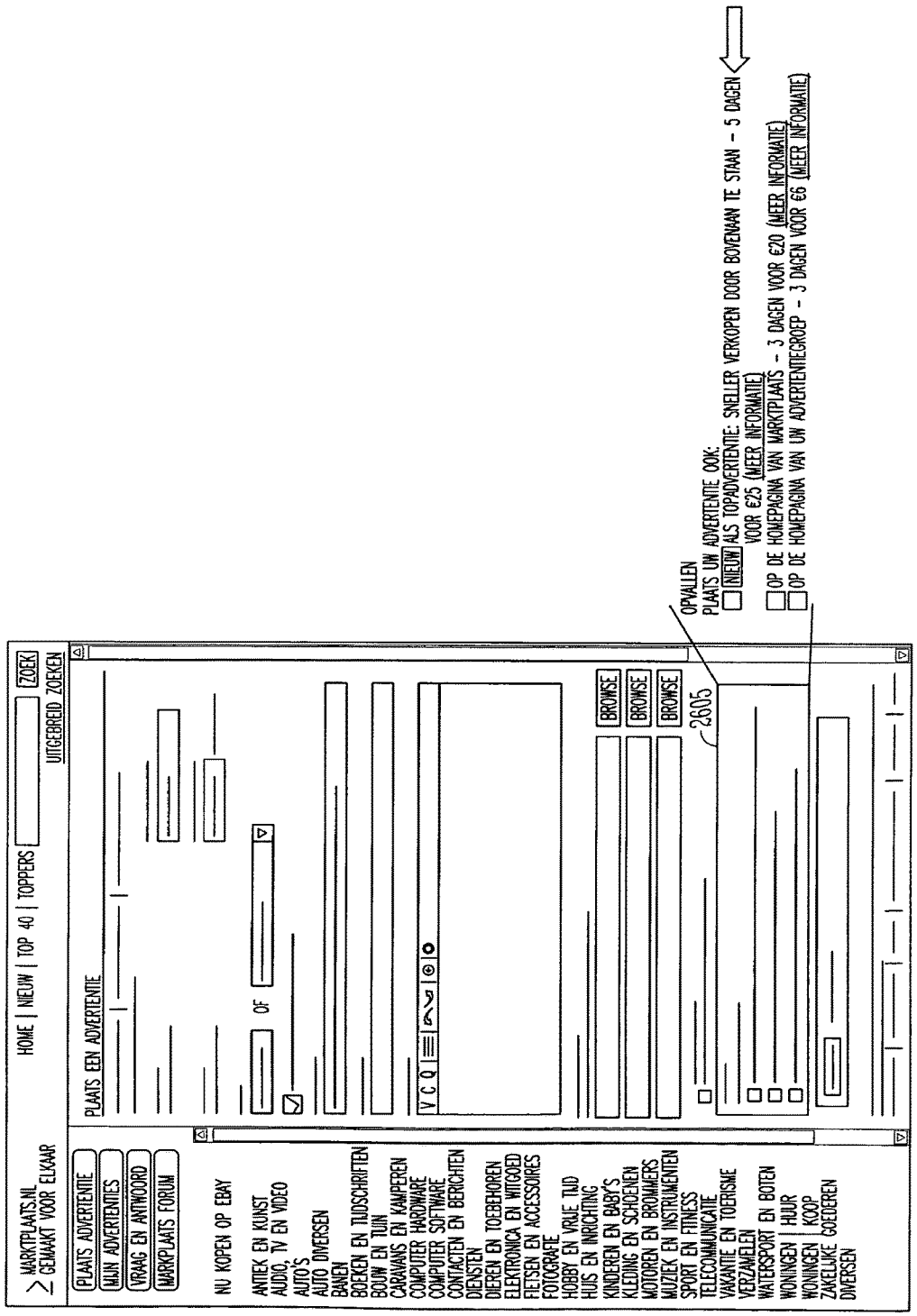
FIG. 7 illustrates an initial user interface screen in the creation of a fixed price ad in an example embodiment.

FIG. 7 illustrates an initial user interface screen displayed in the creation of a fixed price ad in an example embodiment (user can select whether he wants to buy the fixed priced ad feature for this ad title, there is no relationship with payment options as such). In this screen, a user can enter the particular details and content of the ad. In addition, a fixed price ad can be purchased as a one click feature added to the conventional process for buying a standard classified ad. In a particular embodiment, the one-click feature to create the fixed price ad is included in option block 2605 shown in FIG. 7.

FIG. 8 illustrates an example user interface screen displayed in the creation of a fixed price ad in an example embodiment. In this screen, a user can select payment options for particular fixed price ads in selected categories. As shown in FIG. 8, each ad (horizontal row 3301) is associated with different fixed price costs for several categories (vertical columns 3303) in which the ad may appear. A user can select a fixed price ad to appear in a selected category listing by marking the associated cost checkbox for the desired ad. As shown, a limit can be defined as a maximum of two fixed price ads per category. If so defined, a user is automatically prevented from selecting more ads in a category than the limit would allow. It will be apparent to those of ordinary skill in the art that other maximum limits can similarly be defined.

Figure 9:
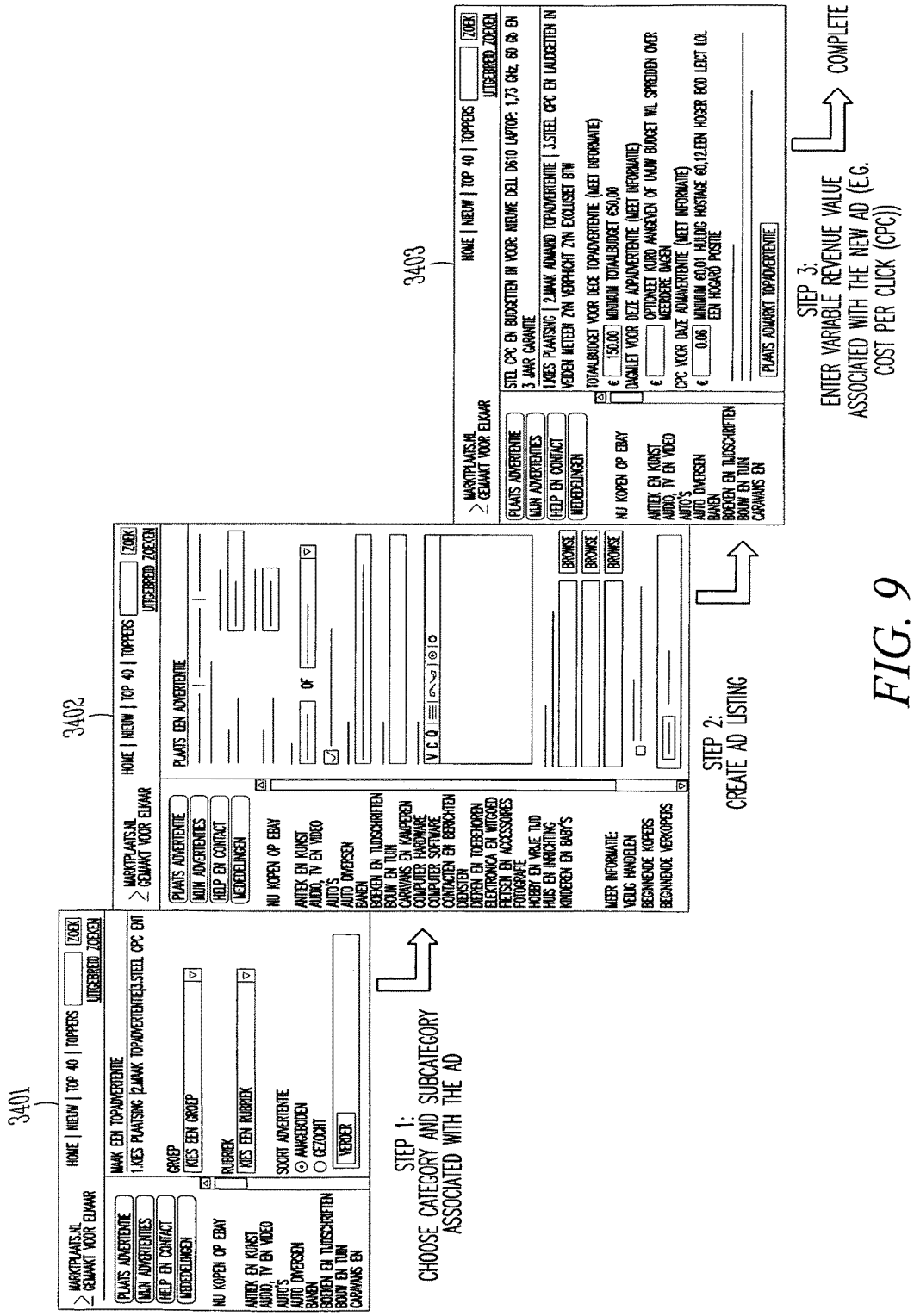
FIG. 9 illustrates three user interface screens in the creation of a variable revenue ad in an example embodiment.

FIG. 9 illustrates three user interface screens in the creation of a variable revenue ad in an example embodiment. In these screens, a user can enter the particular details and content of a variable revenue ad. In the first screen 3401, a user can select one or more categories and/or subcategories associated with the new variable revenue ad. In a second screen 3402, a user can set various parameters for the ad and enter the content of the ad. In a third screen 3403, a user can enter a variable revenue value (e.g. CPC) associated with the new ad. Using the variable revenue value, the user can establish an RPM value (which is not disclosed to user) associated with the ad that is used as described above to prioritize the display position for the variable revenue ad in the host site listing. Thus, the variable revenue value can be used to control the display position associated with the variable revenue ad. Typically, a higher variable revenue value corresponds to a better display position for the ad on the host site. However, a higher variable revenue value corresponds to higher costs for the merchant/advertiser. The costs and performance of each variable revenue ad can be monitored using the detailed reports produced by various embodiments as described in more detail below.

Figure 10:
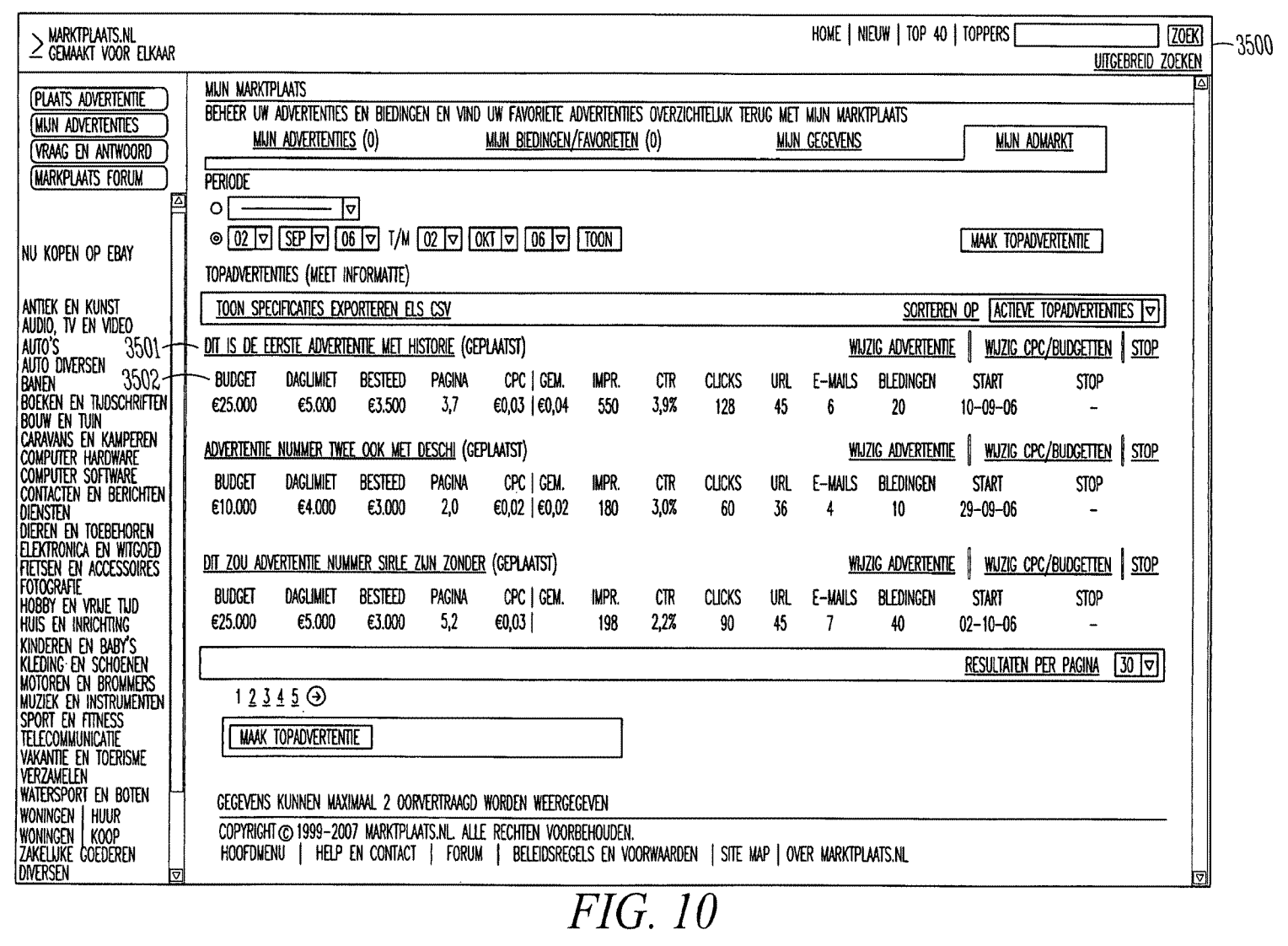

FIG. 10 illustrates a detailed results report 3500 that enables a merchant/advertiser to view a set of metrics related to each advertisement (variable revenue or fixed price) the merchant/advertiser has created in the system of a particular embodiment. As shown in FIG. 10, each ad (horizontal row 3301) is associated with several different metrics (vertical columns 3303) associated with the corresponding ad. In an example embodiment, these metrics include a budget associated with the ad, a daily cost limit, a total spend value, the average page or pages on which the ad was shown, the average CPC associated with the ad, the average CTR associated with the ad, the number of clicks to view the view item page, the number of clicks from the view item page to the seller website, the number of emails related to the subject of the ad, the number of bids related to the subject of the ad, the date/time the ad was created or display of the ad started, and the date/time the ad was terminated or display of the ad stopped. It will be apparent to those of ordinary skill in the art that many other metrics can be captured and displayed as part of the results report 3500. These metrics enable the merchant/advertiser to manage their portfolio of advertisements and monitor the effectiveness of the ads on the host site.

Figure 11:
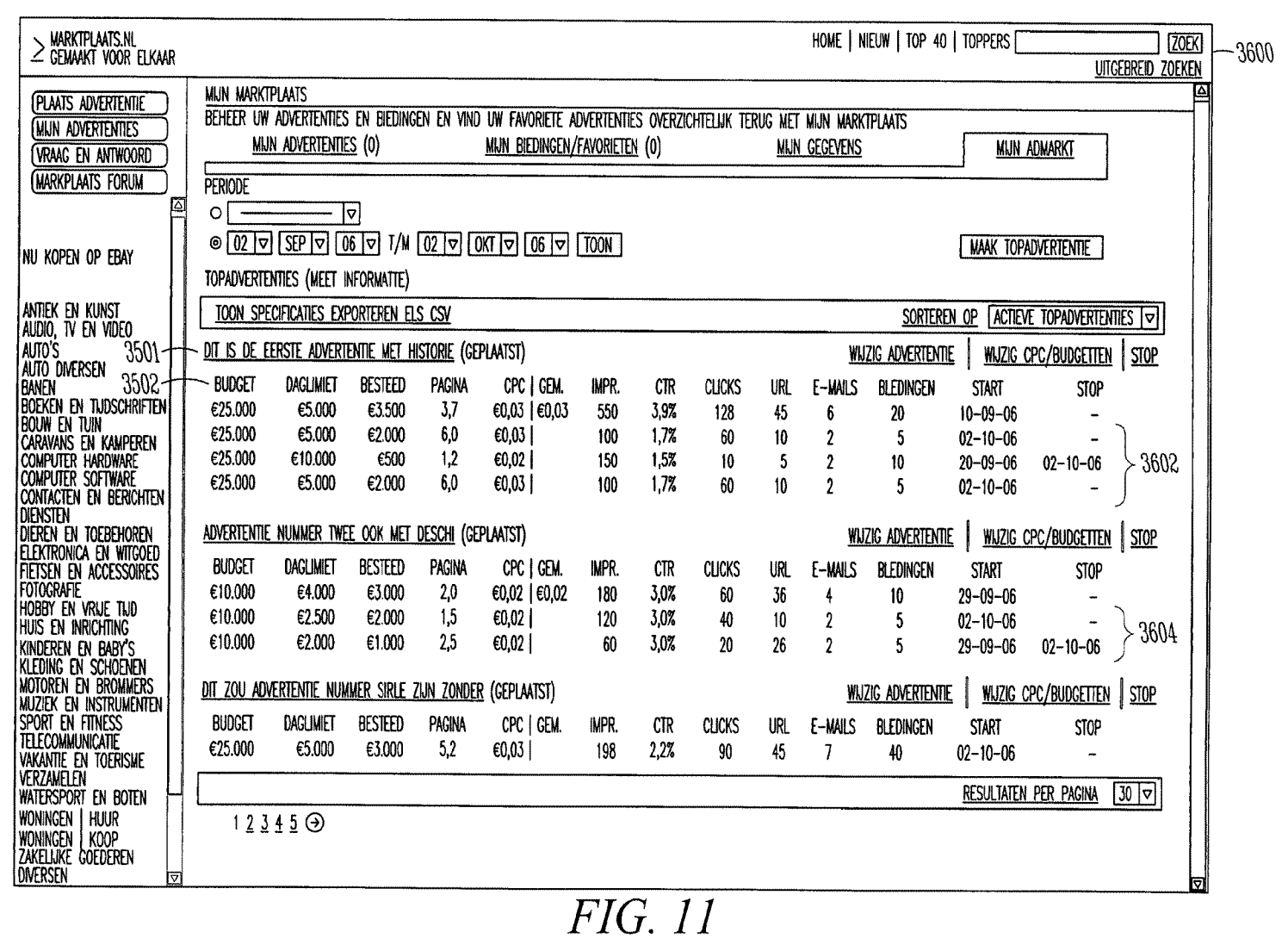

FIG. 11 illustrates another detailed results report 3600 that includes a view of historical information related to each advertisement (variable revenue or fixed price) the merchant/advertiser has created in the system of a particular embodiment. As shown in FIG. 11, each ad (horizontal row 3301) is associated with several different metrics (vertical columns 3303) associated with the corresponding ad. In an example embodiment, these metrics include historical information 3602 and 3604 for each of the first two ads listed in report 3600. In a particular embodiment, these historical metrics include a different row of metrics for each change the merchant/advertiser made to the configuration of an ad over the time the ad was active. These historical metrics enable the advertiser to determine if changes to the configuration of a particular ad were effective in increasing the performance (note: it may not be revenue related) associated with the ad.

Figure 12:
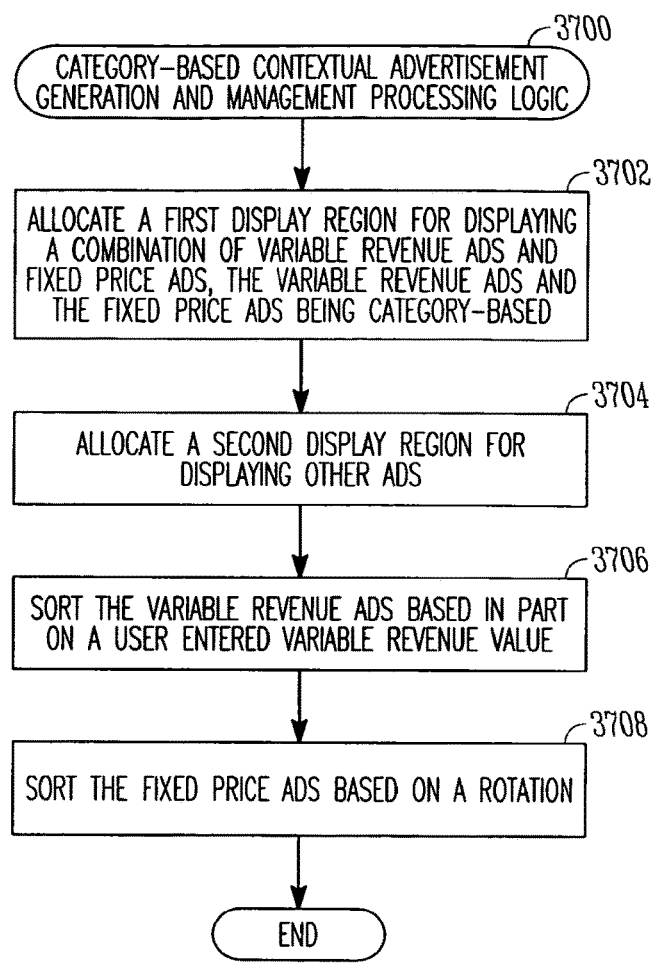
FIG. 12 is a processing flow diagram that illustrates the processing flow in an example embodiment.

FIG. 12 is a processing flow diagram that illustrates the processing flow in an example embodiment. As shown, an example embodiment allocates a first display region for displaying a combination of variable revenue ads and fixed price ads, the variable revenue ads and the fixed price ads being category-based; allocates a second display region for displaying other ads; sorts the variable revenue ads based in part on a user entered variable revenue value; and sorts the fixed price ads based on a rotation.

Figure 13:
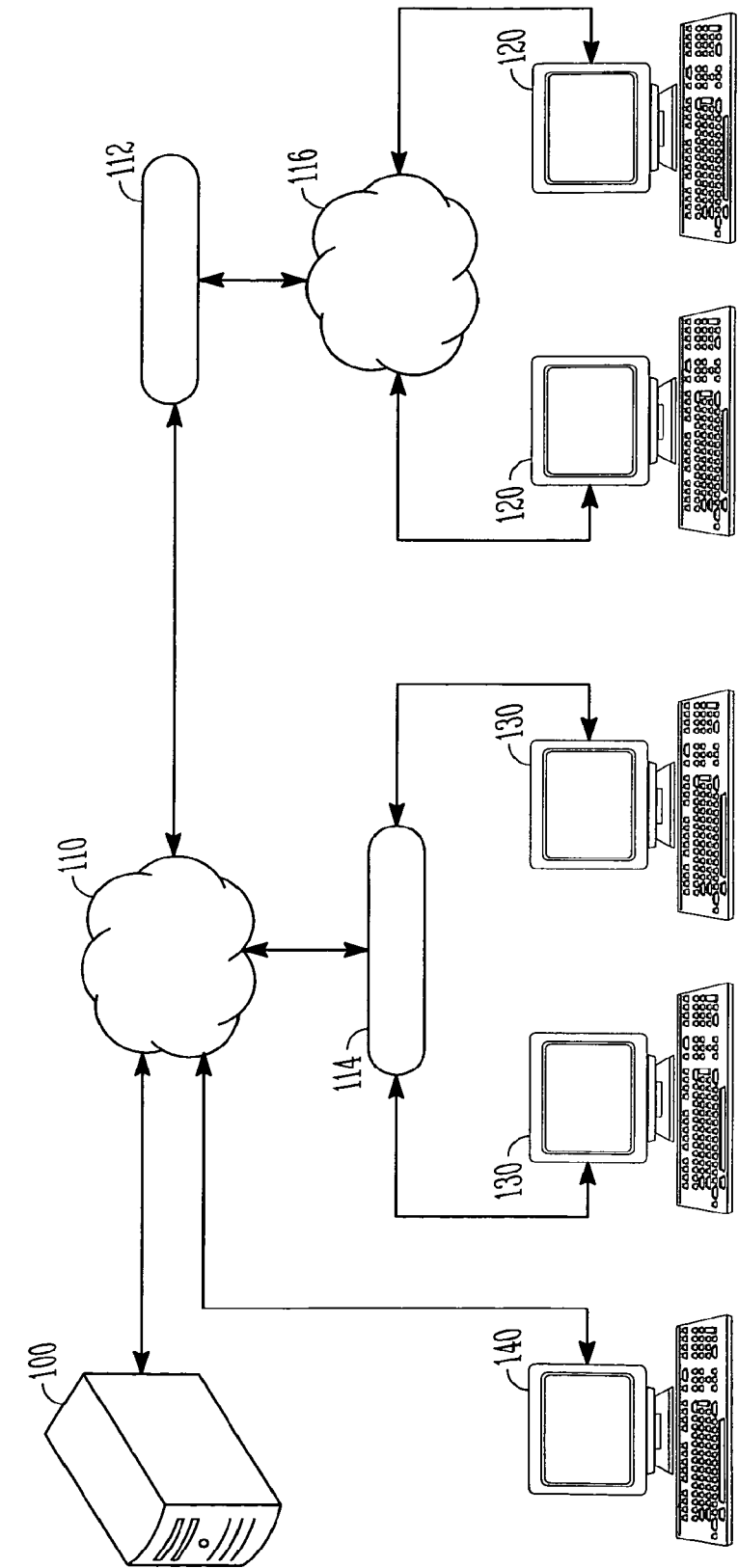
FIG. 13 is a block diagram of a network system on which an embodiment may operate.

Referring now to FIG. 13, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 14:
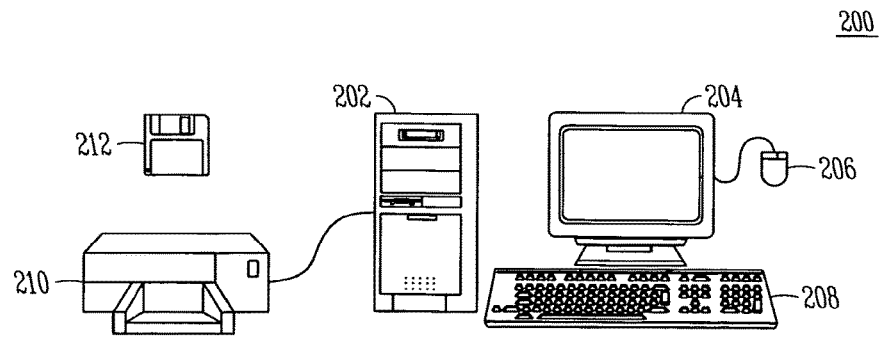
FIGS. 14 and 15 are block diagrams of a computer system on which an embodiment may operate.
Figure 15:
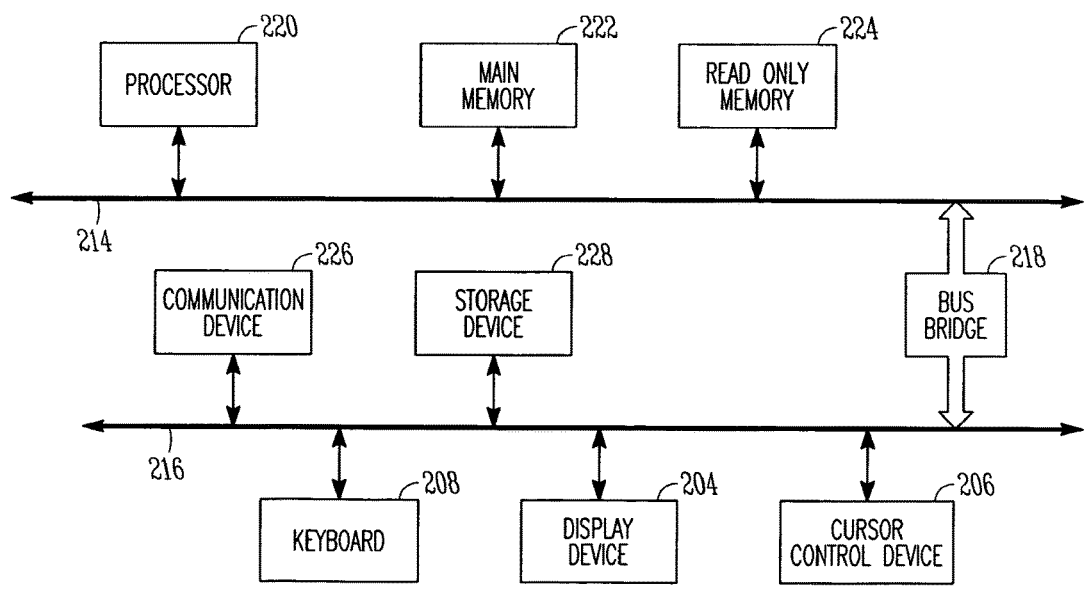

Having briefly described one embodiment of the network environment in which an example embodiment may operate, FIGS. 14 and 15 show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 13 and described above.

The system of an example embodiment includes software, information processing hardware, and various processing steps, which will be described below. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and method for category-based contextual advertisement generation and management are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method, comprising:
   receiving, at a computer system from a user, a search query entered by the user via an input interface displayed on a user device;
   causing allocation, by the computer system in response to the search query, of a first display region of the user device for displaying a combination of variable revenue ads and fixed price ads, the first display region including a first display portion allocated for display of only variable revenue ads and a second display portion allocated for display of only fixed price ads;

in response to a determination that there are not enough fixed price ads in a paid inventory of fixed price ads to fill positions allocated for fixed price ads in the first display region, the computer system moving at least one variable revenue ad into a position in the first display region that would otherwise be occupied by a fixed price ad, wherein the at least one variable revenue ad is selected to occupy the position based at least in part on a number of clicks associated with the at least one variable revenue ad;

causing display, by the computer system, of the first display region on the user device, including the first display portion including only variable revenue ads and the second display portion including only fixed price ads;

receiving a selection of one of the variable revenue ads or one of the fixed price ads; and causing a view item page to be presented on the user device, the view item page being associated with the selected one of the variable revenue ads or one of the fixed price ads, the view item page being a different page than a first page, the view item page including a link to a merchant website that is associated with the selected one of the variable revenue ads or the one of the fixed price ads.

2. The method of claim 1, further comprising causing allocation, by the computer system in response to the search query, of a second display region of the user device for displaying other ads, wherein the second display region is concurrently visible with the first display region.

3. The method of claim 1, further comprising:
sorting the variable revenue ads in the first display portion using a first sorting process based in part on an advertiser-provided variable revenue value; and
sorting the fixed price ads in the second display portion using a second sorting process based on a rotation.

4. The method of claim 3, further comprising sorting other ads in a second display region of the user device using a sorting process different from the first and second sorting processes.

5. The method of claim 1, wherein ads of the first display portion are displayed based on a first sorting process, the first sorting process comprising sorting the variable revenue ads based in part on user activity, and wherein ads of the second display portion are displayed based on a second sorting process, the first sorting process being different from the second sorting process.

6. The method of claim 1, wherein costs for each of the fixed price ads are determined based on one or more corresponding fixed prices, and wherein costs for each of the variable revenue ads are based on one or more corresponding prices that are variable based on values for one or more criteria.

7. The method of claim 1, the view item page being presented on a host site in response to the user selecting an associated ad on the first page on the host site, wherein the user is directed from the first page to the view item page in response to the user clicking on the associated ad.

8. The method of claim 1, wherein the input interface is implemented on a website associated with a particular Internet domain.

9. The method of claim 1, wherein the input interface is implemented on a mobile device application other than a web browser application.

10. The method of claim 1, wherein at least one of the variable revenue ads is displayed on the user device at a greater level of visual prominence than at least one of the fixed price ads.

11. A non-transitory computer-readable medium having instructions stored thereon that are executable by a computer system to cause the computer system to perform operations comprising:
receiving, from a user, a query entered by the user via an input interface displayed on a first web site;
causing allocation, in response to the query, of a first display region of a user device for displaying a combination of variable revenue ads and fixed price ads, the first display region including a first display portion allocated for display of only variable revenue ads and a second display portion allocated for display of only fixed price ads;
in response to a determination that there are not enough fixed price ads in a paid inventory of fixed price ads to fill positions allocated for fixed price ads in the first display region, moving at least one variable revenue ad into a position in the first display region that would otherwise be occupied by a fixed price ad, wherein the at least one variable revenue ad is selected to occupy the position based at least in part on a number of clicks associated with the at least one variable revenue ad;
causing display of the first display region on the user device, including the first display portion including only variable revenue ads and the second display portion including only fixed price ads;
receiving a selection of one of the variable revenue ads or one of the fixed price ads; and
causing a view item page to be presented on the user device, the view item page being associated with the selected one of the variable revenue ads or one of the fixed price ads, the view item page being a different page than a first page, the view item page including a link to a merchant website that is associated with the selected one of the variable revenue ads or the one of the fixed price ads.

12. The non-transitory computer-readable medium of claim 11, wherein causing allocation of the first display region comprises causing a webpage associated with a first website to reserve one or more visual portions for display at least one of the variable revenue ads and at least one of the fixed price ads.

13. The non-transitory computer-readable medium of claim 12, wherein the webpage is on the first website.

14. The non-transitory computer-readable medium of claim 11, wherein ads of the first display portion are displayed based on a first sorting process, the first sorting process comprising sorting the variable revenue ads based in part on user activity, and wherein ads of the second display portion are displayed based on a second sorting process, the first sorting process being different from the second sorting process.

15. The non-transitory computer-readable medium of claim 11, wherein the operations further comprise:
sorting the variable revenue ads in the first display portion using a first sorting process based in part on an advertiser-provided variable revenue value; and
sorting the fixed price ads in the second display portion using a second sorting process based on a rotation.

16. The non-transitory computer-readable medium of claim 11, wherein the operations further comprise tracking user selection activity for each ad displayed on the user device via the first display region.

17. A system, comprising:
a processor; and
a storage device having instructions stored thereon that are executable to cause the system to perform operations comprising:
receiving, from a user, a query entered by the user via an input interface;
causing allocation, in response to the query, of a first display region of a user device for displaying a combination of variable revenue ads and fixed price ads, the first display region including a first display portion allocated for display of only variable revenue ads and a second display portion allocated for display of only fixed price ads;
in response to a determination that there are not enough fixed price ads in a paid inventory of fixed price ads to fill positions allocated for fixed price ads in the first display region, moving at least one variable revenue ad into a position in the first display region that would otherwise be occupied by a fixed price ad, wherein the at least one variable revenue ad is selected to occupy the position based at least in part on a number of clicks associated with the at least one variable revenue ad;
causing display of the first display region on the user device, including the first display portion including only variable revenue ads and the second display portion including only fixed price ads;
receiving a selection of one of the variable revenue ads or one of the fixed price ads; and
causing a view item page to be presented on the user device, the view item page being associated with the selected one of the variable revenue ads or one of the fixed price ads, the view item page being a different page than a first page, the view item page including a link to a merchant website that is associated with the selected one of the variable revenue ads or the one of the fixed price ads.

18. The system of claim 17, wherein the operations further comprise causing allocation, in response to the query, of a second display region of the user device for displaying other ads, wherein the second display region is concurrently visible with the first display region.

19. The system of claim 17, wherein the variable revenue ads and the fixed price ads are based on an advertiser selectable category.

20. The system of claim 17, wherein the operations further comprise:
sorting the variable revenue ads in the first display portion using a first sorting process based in part on an advertiser-provided variable revenue value; and
sorting the fixed price ads in the second display portion using a second sorting process based on a rotation.

* * * * *